(12) United States Patent
Xie

(10) Patent No.: US 6,834,951 B2
(45) Date of Patent: *Dec. 28, 2004

(54) SPECTACLES SET WITH DETACHABLE MAGNETIC SHELTER FRAME

(76) Inventor: Yiling Xie, 1009 Arcadia Ave., Suite 3, Arcadia, CA (US) 91007

(*) Notice: Subject to any disclaimer, the term of this patent is extended or adjusted under 35 U.S.C. 154(b) by 0 days.

This patent is subject to a terminal disclaimer.

(21) Appl. No.: 10/718,450

(22) Filed: Nov. 19, 2003

(65) Prior Publication Data

US 2004/0100614 A1 May 27, 2004

Related U.S. Application Data

(62) Division of application No. 10/216,694, filed on Aug. 12, 2002, now Pat. No. 6,729,723.

(51) Int. Cl.[7] ................................................ G02C 7/08
(52) U.S. Cl. .......................................... 351/57; 351/47
(58) Field of Search ..................................... 351/47, 57

(56) References Cited

U.S. PATENT DOCUMENTS

| | | | | |
|---|---|---|---|---|
| 6,331,057 B1 * | 12/2001 | Strube | .......................... | 351/47 |
| 6,382,787 B1 * | 5/2002 | Xie | .............................. | 351/47 |
| 6,412,941 B1 * | 7/2002 | Xiao | ............................ | 351/47 |
| 6,540,348 B1 * | 4/2003 | Xie | .............................. | 351/57 |
| 2002/0057415 A1 * | 5/2002 | Xiao | ............................ | 351/86 |
| 2002/0140897 A1 * | 10/2002 | Huang | ........................ | 351/57 |

* cited by examiner

Primary Examiner—Huy Mai
(74) Attorney, Agent, or Firm—Raymond Y. Chan; David and Raymond Patent Group

(57) ABSTRACT

A spectacles set includes a primary spectacle frame and a detachable shelter frame adapted for mounting in front of the primary spectacle frame. The detachable shelter frame includes a shelter frame for supporting two auxiliary lenses and a pair of magnetic attaching arrangements connected to the shelter frame. Each of the magnetic attaching arrangements includes a supporting arm extending rearwardly from an inner side of the auxiliary lens of the shelter frame and a magnetic seat which is extended from the supporting arm to magnetically attach the magnetic holder provided on a nose support of the primary spectacle frame so as to hold the shelter frame in front of the primary spectacle frame in position.

14 Claims, 9 Drawing Sheets

SPECTACLES SET WITH DETACHABLE MAGNETIC SHELTER FRAME

CROSS REFERENCE OF RELATED APPLICATIONS

This is a divisional application of a non-provisional application, application Ser. No. 10/216,694, filed Aug. 12, 2002 now U.S. Pat. No. 6,729,723.

BACKGROUND OF THE PRESENT INVENTION

1. Field of Invention

The present invention relates to spectacle frame, and more particularly to a spectacles set, which comprises a detachable shelter frame adapted for mounting on a primary spectacle frame by means of magnetic attraction

2. Description of Related Arts

Shelter frames are widely used today. A conventional shelter frame, such as clip-on sunglasses, comprises a plurality of clipping claws for detachably mounted on a shortsighted or farsighted sunglasses so that the wearer does not need to carry and pay for another pair of shortsighted or farsighted sunglasses. However, the metal made clipping claws may scratch the lenses of the primary eyeglasses during the attaching operation. Also, the wearer requires both hands to align and engage the conventional clip-on sunglasses on the primary eyeglasses in correct position. It is troublesome and dangerous for a wearer to use his or her both hands to wear such clip-on sunglasses on the regular glasses while he or she is driving.

In order to solve the problem of the above mentioned clip-on sunglasses, magnetic attachment is recently introduced into the eyeglasses industry, such as U.S. Pat. Nos. 5,416,537, 5,568,207, 5,642,177, 5,737,054, and 5,975,691. For example, in U.S. Pat. No. 5,568,207, a primary pair of magnet members is affixed on two side extensions of a primary spectacle frame respectively. A shelter frame, such as a sunglasses, includes a pair of arms for resting over the upper side extensions for preventing the shelter frame from moving downward relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Moreover, both the primary spectacle frame and the shelter frame are made of metal such that the once the spectacle frame is accidentally bent its shape, the shelter frame may not precisely mounted on the primary spectacle by means of the magnet attachment. Thus, the design of the shelter frame is restricted by the material so as to limit the shelter frame to provide an aesthetic appearance thereof.

SUMMARY OF THE PRESENT INVENTION

A main object of the present invention is to provide a spectacles set which comprises a detachable shelter frame adapted for precisely and easily attaching on a primary spectacle frame by means of a magnetic engaging arrangement so as to securely mount on the primary spectacle frame without the risk of scratching the lenses of the primary spectacle frame.

Another object of the present invention is to provide a spectacles set, wherein the primary spectacle frame and the shelter frame can be made of different materials so as to enhance the aesthetic appearance of the spectacles set. In other words, a metal made primary spectacle frame is capable of matching with a plastic made shelter frame or a plastic made primary spectacle frame is capable of matching with a metal made shelter frame so that the wearer is able to simply change the appearance of the spectacles set without altering the original primary spectacle frame.

Another object of the present invention is to provide a spectacles set, wherein the magnet engaging arrangement is hidden behind the nose supports of the primary spectacle frame so as to keep the aesthetic appearance of the primary spectacle frame.

Another object of the present invention is to provide a spectacles set, wherein the nose supports are adapted to be adjusted their positions with respect to the primary spectacle frame in order to fit the wearer, the wearer may still self-adjust the magnet engaging arrangement to align with the detachable shelter frame even the shape of the primary spectacle frame is slightly distorted.

Another object of the present invention is to provide a spectacles set, wherein two supporting arms of the magnetic attaching arrangement are securely mounted on a primary bridge of the primary spectacle, so as to prevent up and down movement or sideward movement of the detachable shelter frame with respect to the primary spectacle frame.

Another object of the present invention is to provide a spectacles set, wherein the wearer may merely use one hand to attach or detach the detachable shelter frame during exercising or driving.

Another object of the present invention is to provide a spectacles set, which does not require to change the original structural design of the primary spectacle frame.

Another object of the present invention is to provide a spectacles set with detachable shelter frame, wherein no magnet is needed to embed into the primary spectacle frame such that no magnetic field is generated around the primary spectacle frame to affect the wearer's health while he or she normally wears the primary spectacle frame.

Accordingly, in order to accomplish the above objects, the present invention provides a spectacles set comprises a primary spectacle frame and a detachable shelter frame adapted for mounting in front of the primary spectacle frame.

The primary spectacle frame comprises a frame body for mounting a pair of lenses in position, wherein the frame body comprises a primary bridge connected between the two lenses, two nose supports extended from two inner sides of the lenses respectively, two magnetic holders each of which has magnetic attraction ability being provided at the two nose supports respectively, and two side extensions provided at two outer sides of the lenses for coupling a pair of temples respectively.

The detachable shelter frame comprises a shelter frame for supporting two auxiliary lenses and a pair of magnetic attaching arrangements provided at the shelter frame wherein each of the magnetic attaching arrangements comprises a supporting arm extending rearwardly from an inner side of the auxiliary lens of the shelter frame towards the respective magnetic holder and a magnetic seat which is provided at the supporting arm and extended to magnetically attach the respective magnetic holder of the primary spectacle frame so as to hold the shelter frame on the primary spectacle frame in position.

DETAILED DESCRIPTION OF THE PREFERRED EMBODIMENT

Figure 1:
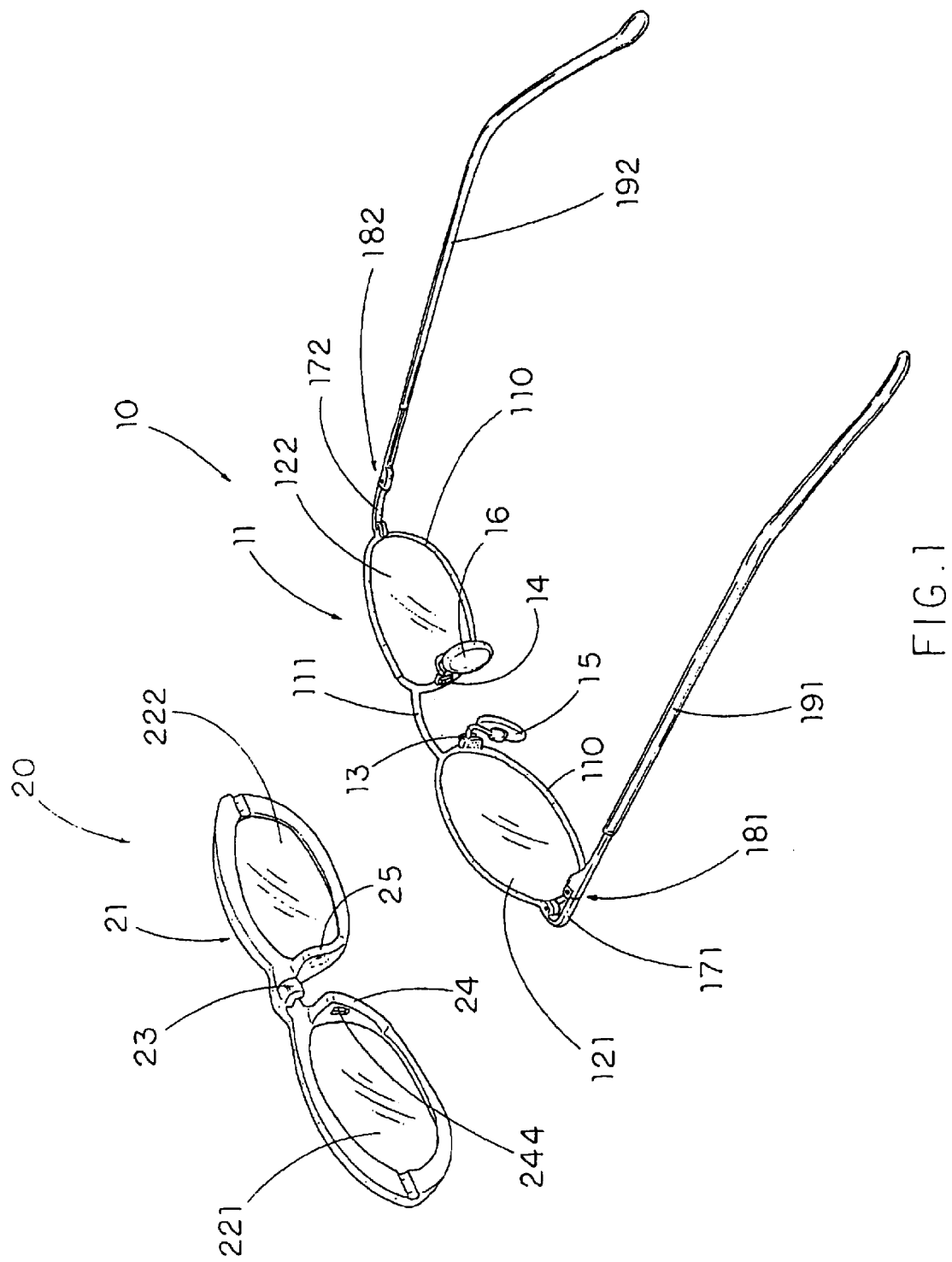
FIG. 1 is a perspective view of a spectacles set according to a first preferred embodiment of the present invention.

Referring to FIG. 1 of the drawings, a spectacles set according to a preferred embodiment of the present invention is illustrated, wherein the spectacles set comprises a primary spectacle frame 10 and a detachable shelter frame 20 adapted for detachably mounting in front of the primary spectacle frame 10.

The primary spectacle frame 10, such as a conventional spectacle frame, comprises a frame body 11 for mounting a pair of lenses 121, 122 in position. The frame body 11 comprises a primary bridge 111 connected between the two lenses 121, 122 respectively, two nose supports 15, 16 are extended from two inner sides of the lenses 121, 122 respectively, two magnetic holders 13, 14 each having magnetic attraction ability provided at the two nose supports 15, 16 respectively, and two side extensions 171, 172 provided at two outer sides of the lenses 121, 122 respectively wherein each of the two side extensions 171, 172 has a hinge portion 181, 182 extended rearwardly therefrom for pivotally coupling a temple 191, 192.

The frame body 11 of the primary spectacle frame 10 can be constructed as the conventional spectacle frame to have a pair of lens rims 110, as shown in FIG. 1, or the rimless frame that the primary bridge 111 and two side extensions 171, 172 are directly fastened to the edges of the two lenses 121, 122, wherein the two magnetic holders 13, 14 are extended from two ends of the primary bridge 111. In other words, the primary spectacle frame 10 does not require modifying its original structure for mounting the detachable shelter frame 20 thereon.

Figure 4:
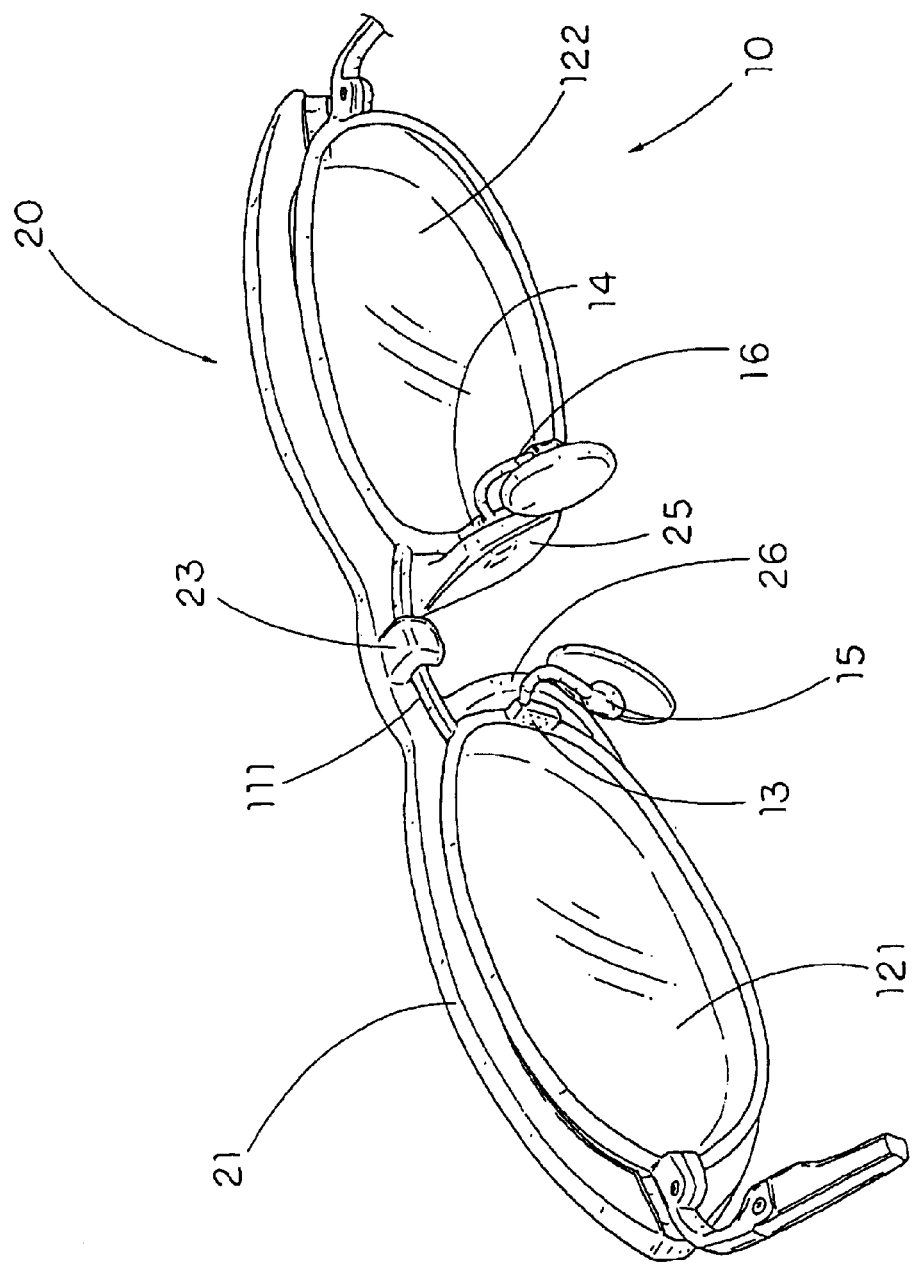
FIG. 4 is a perspective view of the spectacles set according to the above first preferred embodiment of the present invention, illustrating the shelter frame being mounted in front of the primary spectacle frame.

The detachable shelter frame 20 comprises a shelter frame 21 for supporting two auxiliary lenses 221, 222 comprising a clip bridge 23 extended between the two auxiliary lenses 221, 222 for securely engaging with the primary bridge 111 of the primary spectacle frame 10 and a pair of magnetic attaching arrangements 24, 25 provided at the shelter frame 21 for holding the shelter frame 21 in front of the primary spectacle frame 10 in position, as shown in FIG. 4.

According to the preferred embodiment, the frame body 11 of the primary spectacle frame 10 is made of rigid material such as metal and the shelter frame 21 of the detachable shelter frame 20 is made of lightweight material such as plastic.

Figure 2:
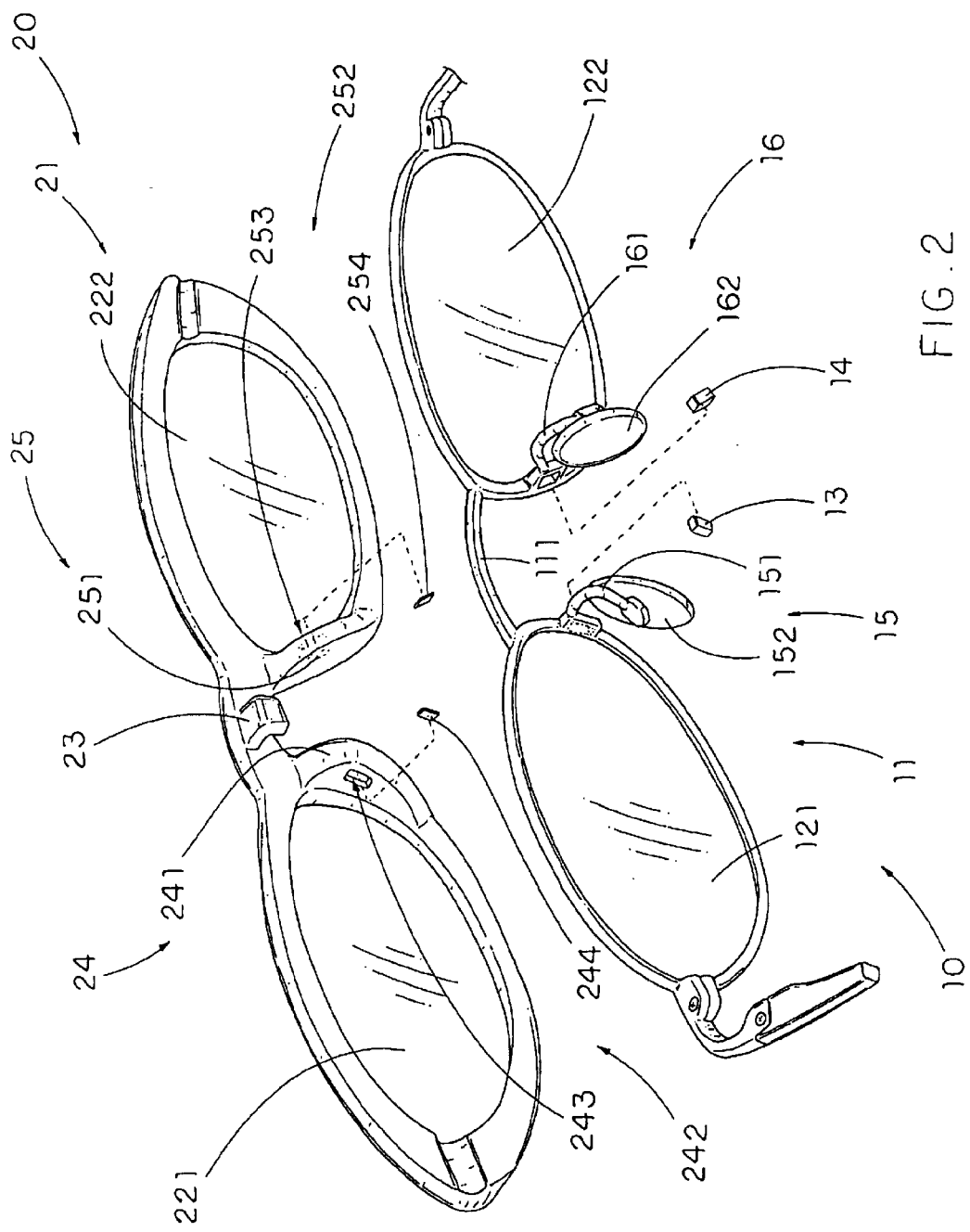
FIG. 2 is a partial enlarged perspective view of the spectacles set according to the above first preferred embodiment of the present invention.

As shown in FIG. 2, each of the nose supports 15, 16 comprises a U-shaped nose supporting member 151, 161 firmly and rearwardly extended from the frame body 11 and a nose piece 152, 162 connected to a rear end of the nose supporting member 151, 161, wherein each of the magnetic holders 13, 14 is provided on the respective nose support 15, 16 at a position between the frame body 11 and the nose supporting member 151, 161.

Each of the magnetic holders 13, 14 is made of a kind of metal having magnetic attraction ability such as mild steel, low carbon steel and high grade steel, which is attractive to magnetic material such as permanent magnet. Accordingly, each of the magnetic holders 13, 14 is firmly attached to the respective nose supporting member 151, 161, as shown in FIG. 2, in such a manner that the primary spectacle frame 10 does not require to alter its original structure in order to incorporate with the shelter frame 21 by means of magnetic engagement.

Each of the magnetic attaching arrangement 24, 25 comprises a supporting arm 241, 251 extending rearwardly from an inner side of the auxiliary lens 221, 222 of the shelter frame 21 towards the magnetic holder 13, 14 of the primary spectacle frame 10 and a magnetic seat 242, 252 which is connected to the supporting arm 241, 242 and arranged to magnetically attach to the magnetic holder 13, 14 of the primary spectacle frame 10 so as to hold the shelter frame 21 of the detachable shelter frame 20 in front of the frame body 11 of the primary spectacle frame 10 in position.

Each of the magnetic seats 242, 252 comprises a magnetic housing 243, 253 provided on the respective supporting arm 241, 251 wherein each magnetic seat 242, 252 is made of non-magnetic material or soft-magnetic metal having magnetic attraction ability such as mild steel, low carbon steel and high grade steel and a magnet 244, 254 mounted in the magnetic housing 243, 253, which is arranged to face toward and align with the respective magnetic holder 13, 14 of the shelter frame 21 when the detachable shelter frame 20 is mounted in front of the primary spectacle frame 10.

According to the preferred embodiment, the supporting arms 241, 251 are integrally extended from two inner sides of the auxiliary lens 221, 222 of the shelter frame 21 respectively wherein the magnetic seats 242, 252 are embedded into two outer sides of the supporting arms 241, 251 respectively to magnetically attach the magnetic holders 13, 14 when the shelter frame 21 of the detachable shelter frame 20 in front of the frame body 11 of the primary spectacle frame 10.

Figure 3:
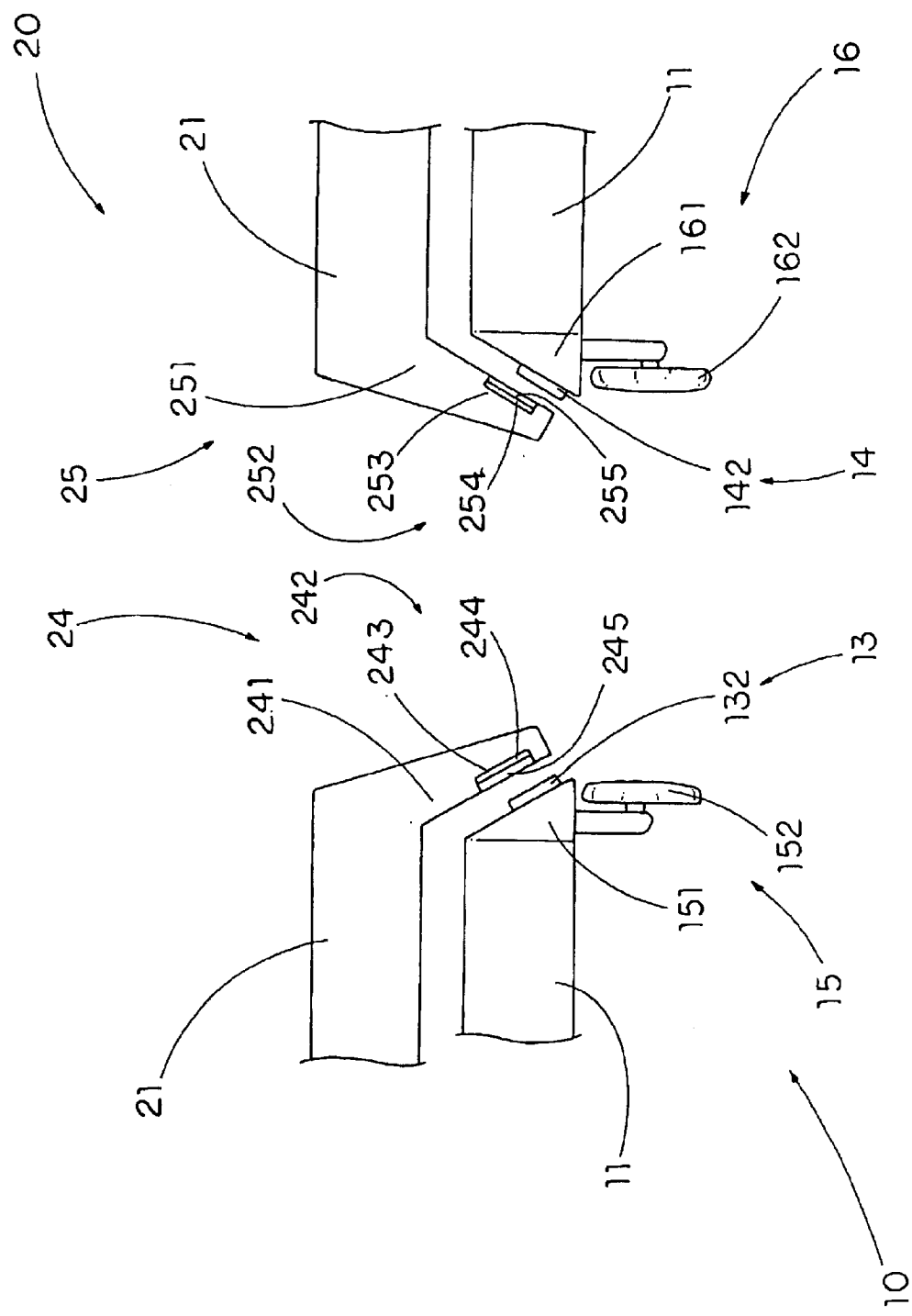
FIG. 3 is a sectional view of the spectacles set according to the above first preferred embodiment of the present invention.

As shown in FIG. 3, the two magnetic holders 13, 14 functions as two engaging members 132, 142 protruded from the nose supports 15, 16. Each magnet 244, 254 having a thickness is smaller than a depth of the respective magnetic housing 243, 253 so as to define an engaging groove 245, 255, when the magnet 244, 254 is embedded in the magnetic housing 243, 253 for fittedly engaging with the respective engaging member 132, 142. In other words, the two magnetic holders 13, 14 are received in the two engaging grooves 245, 255, so as to further guide the two magnetic attaching arrangement 24, 25 to magnetically attach to the two magnetic holder 13, 14 respectively.

The clip bridge 23 of the shelter frame 21 of the detachable shelter frame 20 is in U-shaped adapted for supporting on the primary bridge 111 of the frame body 11, so that the clip bridge 23 is securely clipped on the primary bridge 111 when the detachable shelter frame 20 is mounted in front of the primary spectacle frame 10, as shown in FIG. 4.

In order to mount the shelter frame 21 in front of the primary spectacle frame 10, the user may simply use one hand to put the shelter frame 21 in front of the frame body 11 and drop it down. The clip bridge 23 is securely clipped on the primary bridge 111 so as to securely interlock the shelter frame 21 with the frame body 11. Moreover, due to the magnetic attraction, the two magnetic seats 242, 252 of the shelter frame 21 are magnetically attracted to the magnetic holders 13, 14 of the frame body 11 respectively, so as to guide the shelter frame 21 to automatically align with the primary spectacle frame 10. So, the present invention provides not only the magnetic attraction but also the interlocking engagement for securely mounting the shelter frame 21 in front of the primary spectacle frame 10.

The user can also detach the shelter frame 21 from the frame body 11 of the primary spectacle frame 10 easily by slightly pulling the shelter frame 21 away from the primary spectacle frame 10 until the two magnetic seats 242, 252 move upwardly apart from the two magnetic holders 13, 14, so as to release the magnetic engagement between the shelter frame 21 and the frame body 11. Then, at the same time, the user may detach the shelter frame 21 by simply lifting it up from the primary spectacle frame 10 with one hand, so as to detach the clip bridge 23 from the primary bridge 111 of the frame body 11. In other words, the user may merely use one hand to attach or detach the detachable shelter frame 20 from the primary spectacle frame 10 especially when the user is exercising or driving that it is dangerous for him or her to user both hands to wear the detachable shelter frame.

It is worth mentioning that since the magnetic holders 13, 14 are attached to the inner sides of the nose supporting members 151, 161 respectively, the magnetic holders 13, 14 are hidden behind the nose supports 15, 16 respectively such that when the shelter frame 21 is mounted in front of the primary spectacle frame 10, the magnetic attachment between the magnetic holders 13, 14 and the magnetic seats 242, 252 will not be seen so as to keep the aesthetic appearance of the primary spectacle frame 10.

Figure 5A:
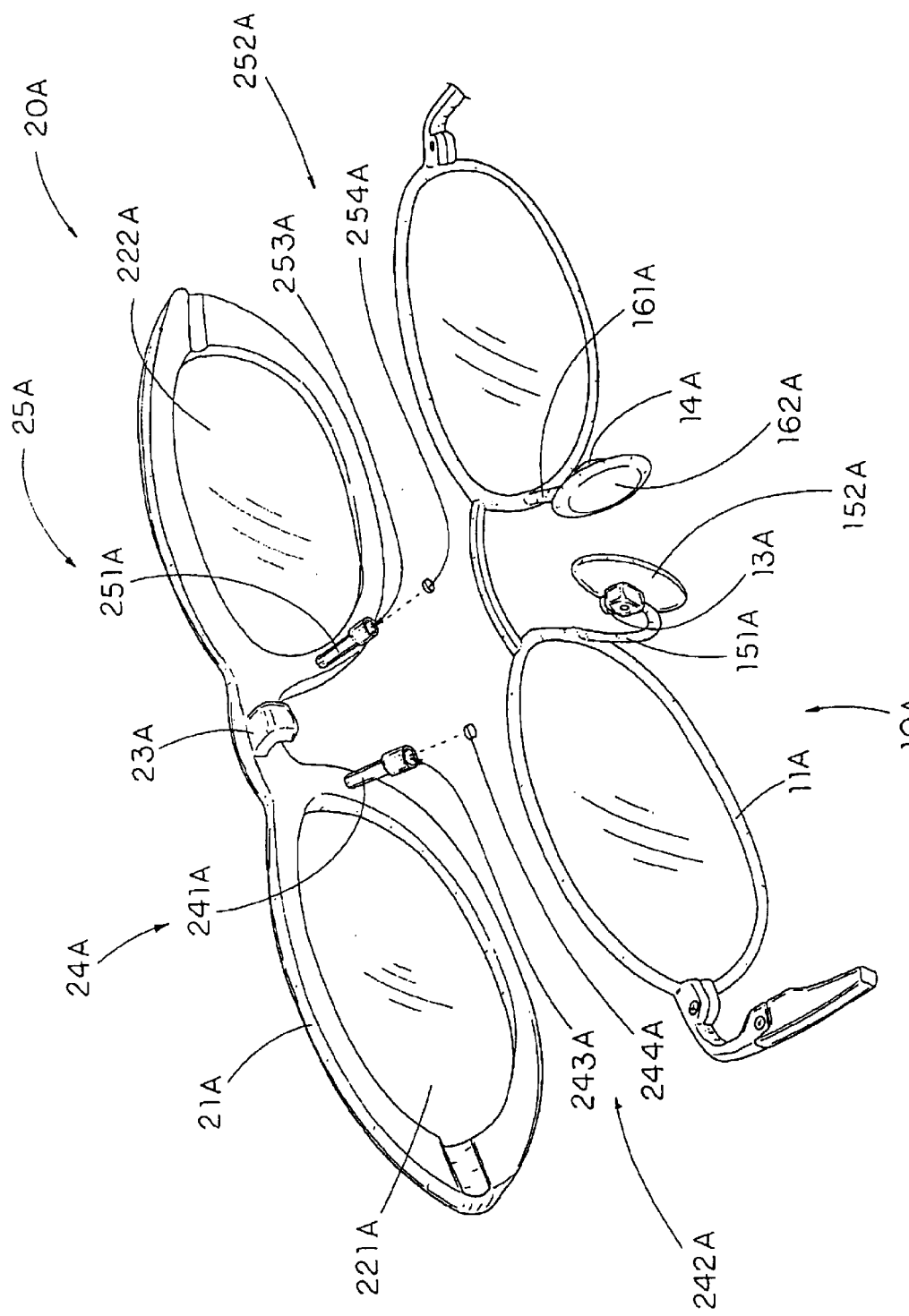
FIG. 5A illustrates a first alternative mode of the spectacles set according to the above first preferred embodiment of the present invention.

FIG. 5A illustrates a first alternative mode of the spectacles set of the first embodiment. Each of the magnetic holders 13A, 14A is provided on the respective nose support 15A, 16A at a position between the nose supporting member 151A, 161A and the nose piece 152A, 162A, wherein each of the magnetic holders 13A, 14A faces towards the shelter frame 21A when the detachable shelter frame 20A is mounted in front of the primary spectacle frame 10A.

Each of the supporting arms 241A, 251A has a front end embedded into the respective inner side of the auxiliary lens 221A, 222A and a rear end connected to the respective magnetic seat 242A, 252A to magnetically attach to the respective magnetic holder 13A, 14A. Accordingly, the magnetic housings 243A, 253A are rearwardly extended from the supporting arms 241A, 251A respectively and the magnets 244A, 254A are provided at rear sides of the magnetic housings 243A, 253A to face toward and align with the magnetic holders 13A, 14A of the frame body 11A when the detachable shelter frame 20A is mounted in front of the primary spectacle frame 10A.

As shown in FIG. 5A, the two supporting arms 241A, 251A are inwardly extended from the shelter frame 21A of the detachable shelter frame 20A in such a manner that the two magnetic seats 242A, 252A are easy to align with the magnetic holders 13A, 14A when the detachable shelter frame 20A is mounted in front of the primary spectacle frame 10A. In other words, a distance between the two auxiliary lenses 221A, 222A where the two supporting arms 241A, 251A extended therefrom is wider than a distance between the two magnetic holders 13A, 14A of the frame body 11A of the primary spectacle frame 10A.

Therefore, the wearer is able to mount the shelter frame 21A in front of the primary spectacle frame 10A by clipping the clip bridge 23A on the primary bridge 111A to securely interlock the shelter frame 21A with the frame body 11A and magnetically attaching the magnetic seats 242A, 252A of the shelter frame 21A to the magnetic holders 13A, 14A respective to guide the shelter frame 21A to automatically align with the primary spectacle frame 10A.

Figure 5B:
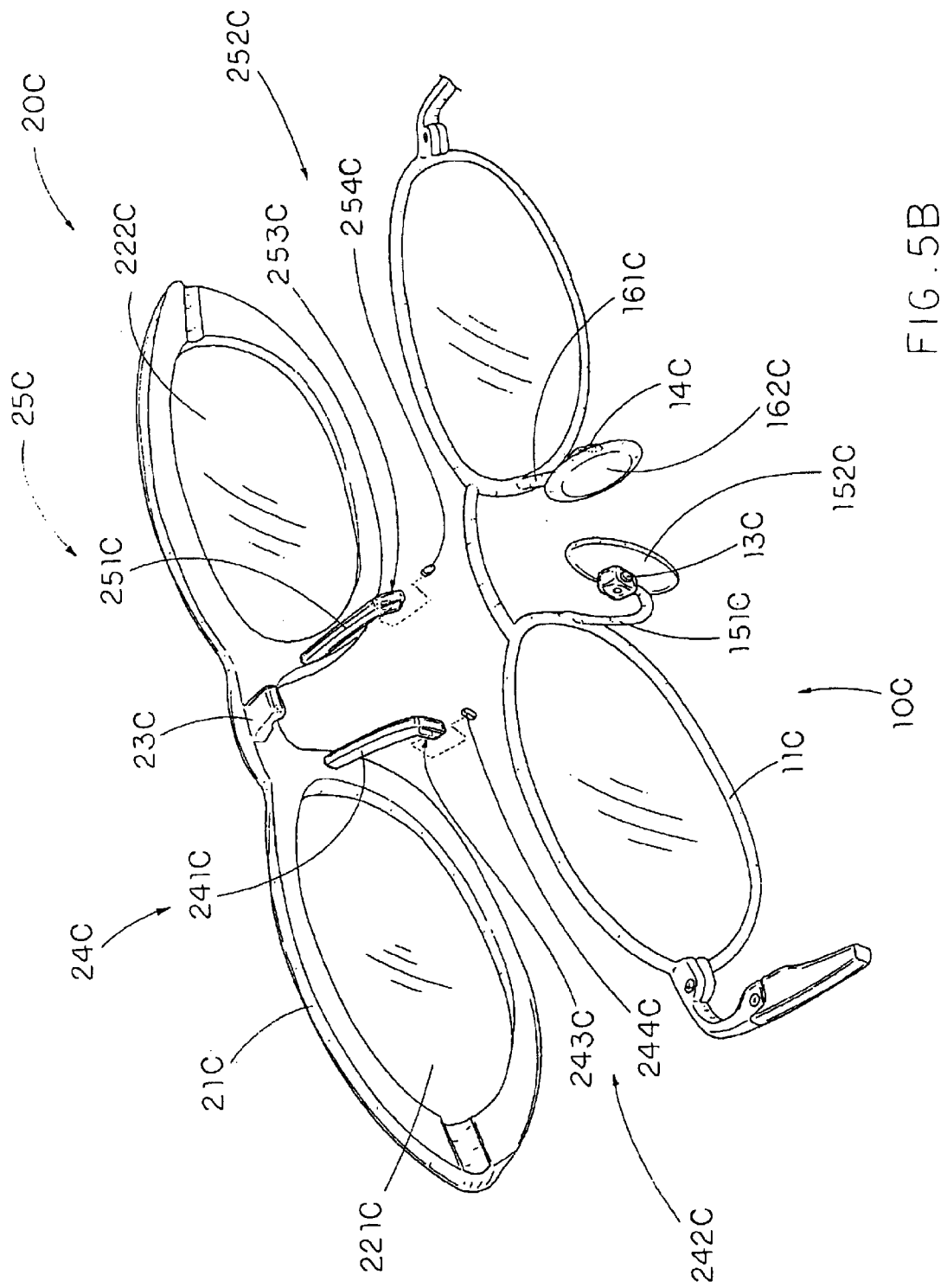
FIG. 5B illustrates a second alternative mode of the spectacle set according to the above first preferred embodiment of the present invention.

FIG. 5B illustrates a second alternative mode of the spectacles set of the first embodiment. Each of the magnetic holders 13C, 14C is provided on the respective nose support 15C, 16C at a position between the nose supporting member 151C, 161C and the nose piece 152C, 162C, wherein each of the magnetic holders 13C, 14C faces opposed to the shelter frame 21C when the detachable shelter frame 20C is mounted in front of the primary spectacle frame 10C.

Each of the supporting arms 241C, 251C, having a L-shaped, has a front end extended from the respective inner side of the auxiliary lens 221C, 222C and a rear end connected to the respective magnetic seat 242C, 252C to magnetically attach to the respective magnetic holder 13C, 14C. Accordingly, the magnetic housings 243C, 253C are frontwardly extended from the rear end of the supporting arms 241C, 251C respectively and the magnets 244C, 254C are provided at front side of the magnetic housings 243C, 253C to face toward and align with the magnetic holders 13C, 14C of the frame body 10C when the detachable shelter frame 20C is mounted in front of the primary spectacle frame 10C.

Therefore, when the detachable shelter frame 20C is mounted in front of the primary spectacle frame 10C, the supporting arms 241C, 251C are rearwardly extended from the inner sides of the auxiliary lenses 221C, 222C to ride over the nose supporting members 151C, 161C while the magnetic seat 242C, 252C is magnetically attached to the magnetic holders 13C, 14C behind the nose supporting members 151C, 161C respectively. Moreover, the clip bridge 23B is clipped on the primary bridge 111C to interlock the shelter frame 21C with the frame body 11C, so that the detachable shelter frame 20C is securely mounted in front of the primary spectacle frame 10C.

Figure 6:
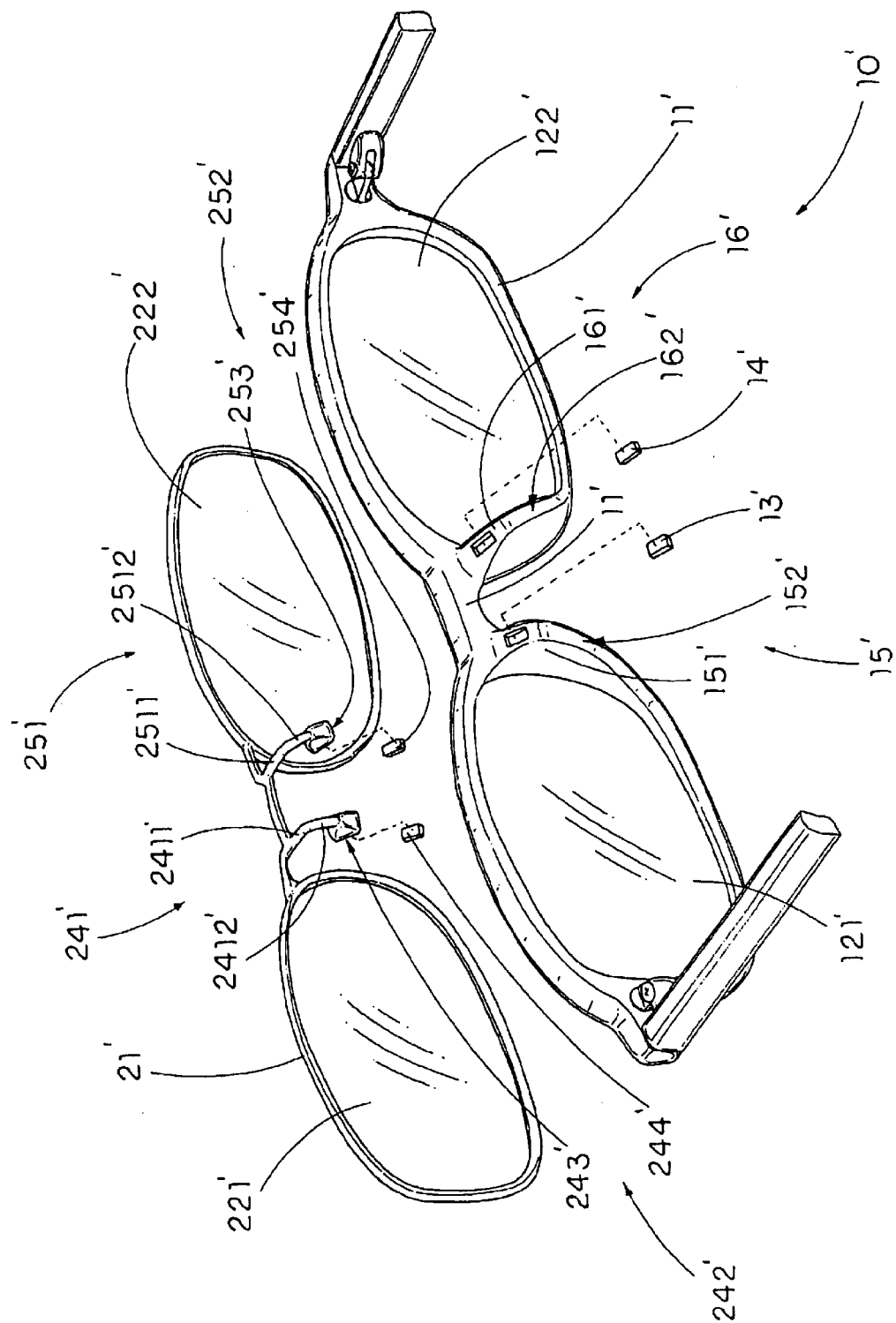
FIG. 6 is a partial enlarged perspective view of a spectacles set according to a second preferred embodiment of the present invention.

As shown in FIG. 6, a spectacles set of a second embodiment illustrates an alternative mode of the first embodiment of the present invention, wherein the detachable shelter frame 20' which is made of metal is adapted to detachably mount in front of a plastic made primary spectacle frame 10'.

Figure 7:
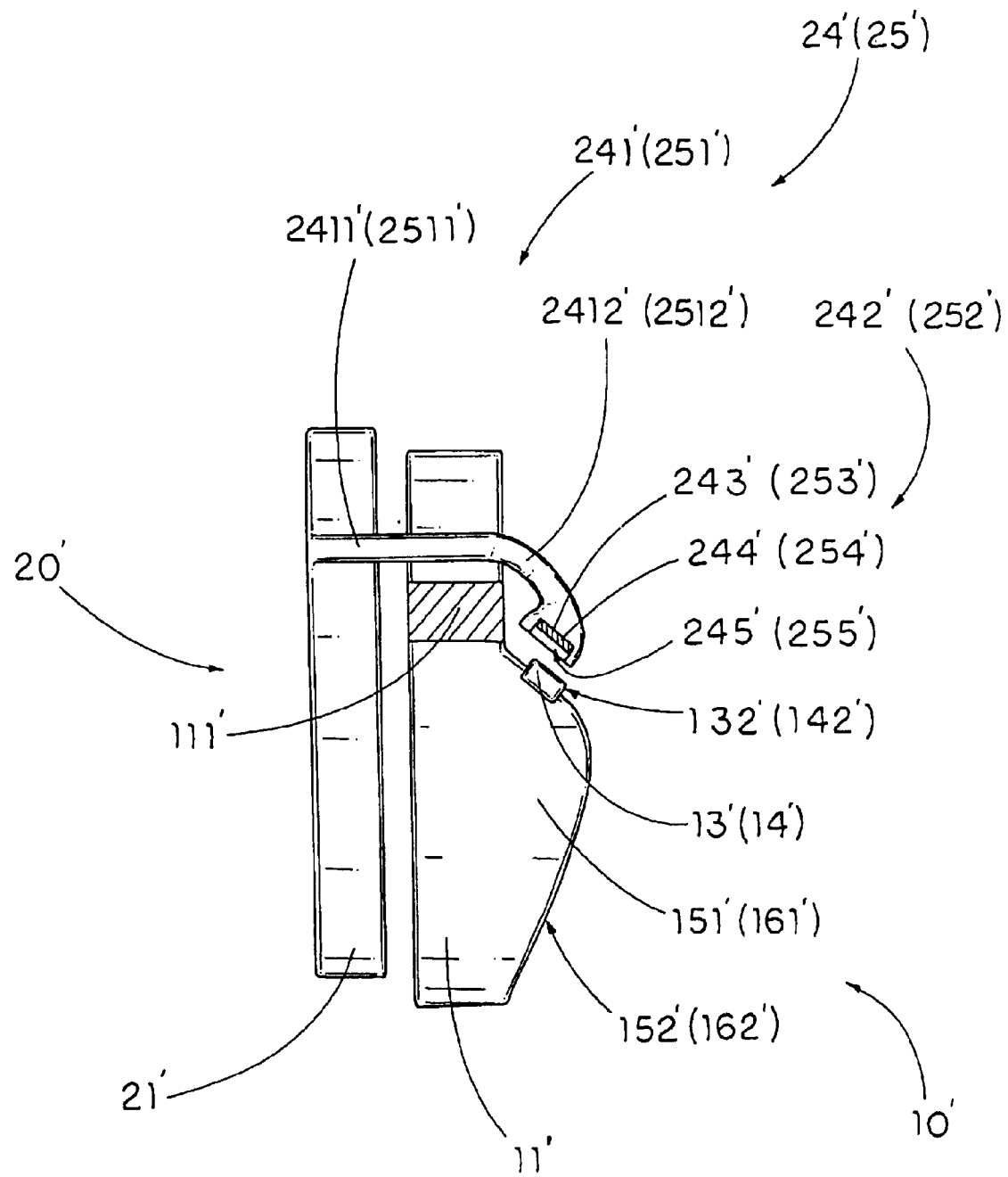
FIG. 7 is a sectional view of the spectacles set according to the above second preferred embodiment of the present invention.

According to the second embodiment, each of the nose supports 15', 16' comprises a nose supporting member 151', 161' integrally and rearwardly extended from the respective inner side of the lenses 121', 122' and a nose piece 152', 162' provided at the nose supporting member 151', 161', wherein each of the nose supporting member 151', 161' has an upper slanted surface and a lower slanted surface formed as the nose piece 152', 162', as shown in FIGS. 6 and 7.

Each of the magnetic holders 13', 14' is provided on the upper slanted surface of the nose supporting member 151', 161' wherein each magnetic holder 13', 14' is made of a kind of metal having magnetic attraction ability such as mild steel, low carbon steel and high grade steel, which is attractive to magnetic material such as permanent magnet. Accordingly, each of the magnetic holders 13', 14' is embedded in the upper slanted surface of the nose supporting member 151', 161'.

As shown in FIG. 6, each of the supporting arms 241', 251', having a L-shaped, comprises a riding body 2411', 2511' rearwardly extended from the inner side of the respective auxiliary lens 221', 222' to ride on the primary bridge 111' of the frame body 10' and a mounting body 2412', 2512' downwardly and integrally extended from a rear end of the respective riding body 2411', 2511' towards the magnetic holders 13', 14' of the primary spectacle frame 10' respectively. In other words, when the shelter frame 21' is mounted in front of the primary spectacle frame 10', the riding bodies 2411', 2511' of the supporting arms 241', 251' ride over the primary bridge 111 while the mounting bodies 2412', 2512' downwardly extend behind the primary bridge 111' and toward the magnetic holders 13', 14' respectively, so as to mount the detachable shelter frame 20' in front of the primary spectacle frame 10', as shown in FIG. 7.

Therefore, the supporting arms 241', 251' functions as a clip bridge for securely clipping on the primary bridge 111' of the frame body 11' so as to interlock the shelter frame 21' with the frame body 11' when the detachable shelter frame 20' is mounted in front of the primary spectacle frame 10'.

Each of the magnetic seats 242', 252' comprises a magnetic housing 243', 253' rearwardly and suspendedly extended from the respective supporting arm 241', 251' and a magnet 244', 254' mounted in the magnetic housing 243', 253', which is arranged to face toward and align with the respective magnetic holder 13', 14' of the shelter frame 21' when the detachable shelter frame 20' is mounted in front of the primary spectacle frame 10'.

Accordingly, each of the magnetic housing 243', 253' is downwardly extended from the respective supporting arm 241', 251' at an inclined position with respect to the upper slanted surface of the nose support 15', 16' in such a manner that the magnetic housings 243', 253' are inclinedly sat on the upper slanted surfaces of the nose supporting members 151', 161' respectively while the magnets 244', 254' are magnetically attached to the magnetic holders 13', 14' respectively, so as to enhance the interlocking engagement between the detachable shelter frame 20' with the primary spectacle frame 10'.

As shown in FIG. 7, the two magnetic holders 13', 14' functions as two engaging members 132', 142' protruded from the nose supports 15', 16'. Each magnet 244', 254' having a thickness is smaller than a depth of the respective magnetic housing 243', 253' so as to define an engaging groove 245', 255', when the magnet 244', 254' is embedded in the magnetic housing 243', 253' for fittedly engaging with the respective engaging member 132', 142. In other words, the two magnetic holders 13', 14' are received in the two engaging grooves 245', 255', so as to further guide the two magnetic attaching arrangement 24', 25' to magnetically attach to the two magnetic holder 13', 14' respectively.

Figure 8:
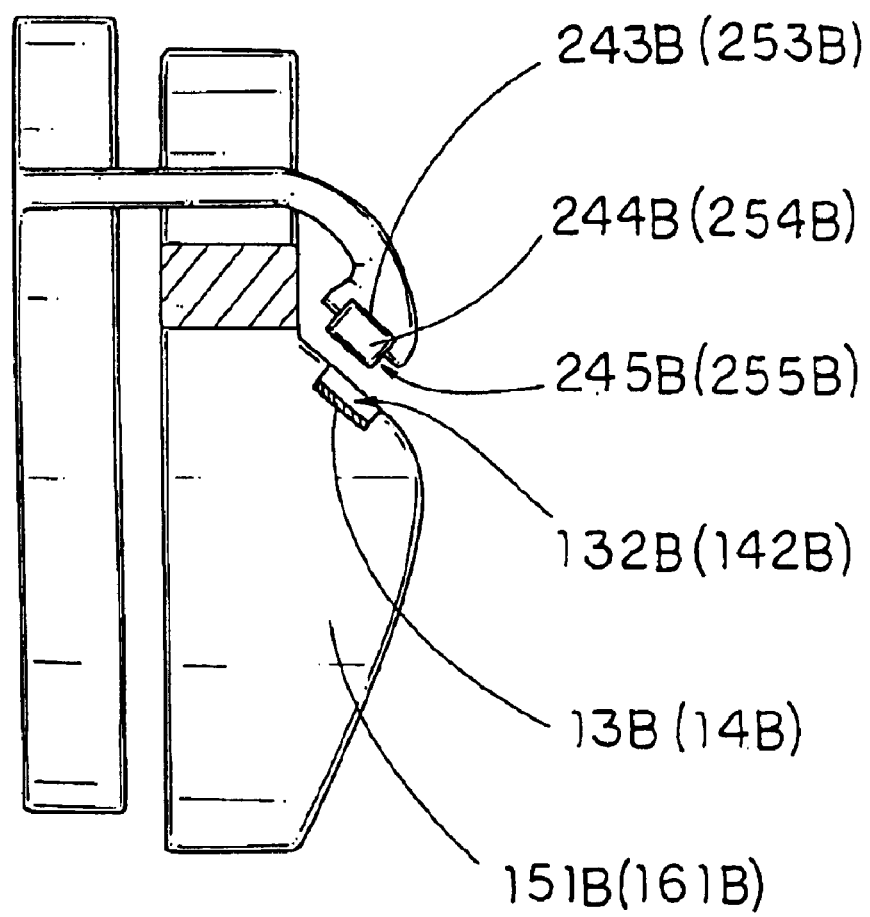
FIG. 8 illustrates an alternative mode of the spectacles set according to the above second preferred embodiment of the present invention.

Alternatively, each magnet 244B, 254B has a thickness larger than the depth of the respective magnetic housing 243B, 253B so as to define the engaging member 245B, 255B on the magnetic housing 243B, 253B, wherein the magnet 244B, 254B is embedded in the magnetic housing 243B, 253B for fittedly engaging the respective engaging groove 132B, 142B of the magnetic holder 13B, 14B indented on the upper slanted surface of the nose supporting member 151B, 161B, as shown in FIG. 8.

Since the primary spectacle frame according to the embodiments and their alternatives do not employed with any magnet, no magnetic field is produced around the primary spectacle frame so that the user is able to wear the primary spectacle frame as usually without affecting by the magnetic field. Thus, both the interlocking engagement and the magnetic attraction are provided by the present invention in order to securely mount the detachable shelter frame in front of the primary spectacle frame.

While the foregoing description and diagram describe the preferred embodiment and its alternatives, it should be appreciated that certain obvious modifications, variations, and substitutions may be made without departing from the spirit and scope of the present invention, such as the shape and size of the magnetic seat and the magnetic holder. Moreover, the magnets can be provided at the magnetic holders respectively while the magnetic seats are made of non-magnetic material or soft-magnetic metal having magnetic attraction ability so as to enhance the magnetic engagement between the shelter frame and the primary spectacle frame.

What is claimed is:

1. A spectacles set, comprising a primary spectacle frame and a detachable shelter frame constructed for detachably mounting in front of said primary spectacle frame;

said primary spectacle frame comprising a frame body for mounting a pair of lenses in position, wherein said frame body comprises a primary bridge connected between said two lenses, two nose supports extended from two inner sides of said lenses, respectively, two magnetic holders, each of which has a magnetic attraction ability, provided at said two nose supports respectively, and two side extensions provided at two outer sides of said lenses for coupling a pair of temples respectively;

said detachable shelter frame comprising a shelter frame for supporting two auxiliary lenses and a pair of magnetic attaching arrangements extended from said shelter frame wherein each of said magnetic attaching arrangements comprises a supporting arm extending rearwardly from an inner side of the auxiliary lenses of said shelter frame towards the respective magnetic holder and a magnetic seat extended from said supporting arm to magnetically attach to said respective magnetic holder of said primary spectacle frame so as to securely mount said detachable shelter frame in front of said primary spectacle frame.

2. The spectacles set, as recited in claim 1, wherein each of said nose supports comprises a nose supporting member rearwardly extended from said frame body and a nose piece connected to a rear end of said nose supporting member, wherein each of said magnetic holders is provided at a front end of said nose supporting member at an outer side thereof to face towards said respective magnetic holder.

3. The spectacles set, as recited in claim 2, wherein said supporting arms are integrally extended from said two inner sides of said shelter frame respectively, wherein the magnetic seats are provided on two outer sides of said supporting arms to align with said magnetic holders respectively so as to magnetically attach said magnetic seats with magnetic holders respectively when said shelter frame of said detachable shelter frame is detachably mounted in front of said frame body of said primary spectacle frame.

4. The spectacles set, as recited in claim 3, wherein each of said magnetic seat comprises a magnetic housing embedded into said outer side of said respective supporting arm and a magnet mounted in said magnetic housing, wherein each said magnetic seat is made of non-magnetic material and is arranged to face toward and align with said respective magnetic holder of said frame body when said detachable shelter frame is mounted in front of said primary spectacle frame.

5. The spectacles set, as recited in claim 4, wherein each of said magnets has a thickness smaller than a depth of said respective magnetic housing so as to define an engaging groove therein when said magnet is embedded in said magnetic housing in such a manner that each said magnetic holder is arranged to receive in said respective engaging groove when said magnetic seat is magnetically attached said respective magnetic holder.

6. The spectacles set, as recited in claim 5, wherein said shelter frame further comprises a clip bridge extended between said two auxiliary lenses to securely clip on said primary bridge of said frame body when said detachable shelter frame is mounted in front of said primary spectacle frame.

7. The spectacles set, as recited in claim 3, wherein said shelter frame further comprises a clip bridge extended between said two auxiliary lenses to securely clip on said primary bridge of said frame body when said detachable shelter frame is mounted in front of said primary spectacle frame.

8. The spectacles set, as recited in claim 1, wherein each of said nose supports comprises a nose supporting member rearwardly extended from said frame body and a nose piece connected to a rear end of said nose supporting member, wherein each of said magnetic holders is provided on said rear end of said respective nose supporting member at a front side thereof.

9. The spectacles set, as recited in claim 8, wherein said supporting arms are rearwardly extended from said two inner sides of said shelter frame respectively, wherein the magnetic seats are provided on two rear ends of said supporting arms to align with said magnetic holders respectively so as to magnetically attach said magnetic seats with magnetic holders respectively when said shelter frame of said detachable shelter frame is detachably mounted in front of said frame body of said primary spectacle frame.

10. The spectacles set, as recited in claim 9, wherein each of said magnetic seat comprises a magnetic housing rearwardly extended from said rear end of said respective supporting arm and a magnet mounted in said magnetic housing, wherein each said magnetic seat is made of non-magnetic material and is arranged to face toward and align with said respective magnetic holder of said frame body when said detachable shelter frame is mounted in front of said primary spectacle frame.

11. The spectacles set, as recited in claim 10, wherein said two supporting arms are inwardly extended from said shelter frame of said detachable shelter frame, wherein a distance between said two auxiliary lenses where said two supporting arms extended is wider than a distance between said magnetic holders of said frame body of said primary spectacle frame.

12. The spectacles set, as recited in claim 11, wherein said shelter frame further comprises a clip bridge extended between said two auxiliary lenses to securely clip on said primary bridge of said frame body when said detachable shelter frame is mounted in front of said primary spectacle frame.

13. The spectacles set, as recited in claim 9, wherein said two supporting arms are inwardly extended from said shelter frame of said detachable shelter frame, wherein a distance between said two auxiliary lenses where said two supporting arms extended is wider than a distance between said magnetic holders of said frame body of said primary spectacle frame.

14. The spectacles set, as recited in claim 9, wherein said shelter frame further comprises a clip bridge extended between said two auxiliary lenses to securely clip on said primary bridge of said frame body when said detachable shelter frame is mounted in front of said primary spectacle frame.

* * * * *